Figure 1:
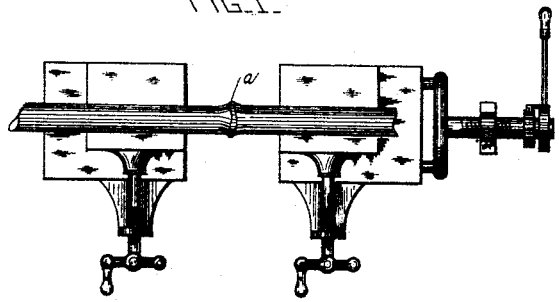

(No Model.)

E. THOMSON.
METHOD OF ELECTRIC WELDING.

No. 449,836. Patented Apr. 7, 1891.

WITNESSES
J. A. Hurdly
T. F. Courey

INVENTOR
Elihu Thomson
By H. C. Townsend
Atty.

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 449,836, dated April 7, 1891.

Application filed July 11, 1890. Serial No. 358,415. (No model.)

*To all whom it may concern:*

Be it known that I, ELIHU THOMSON, a citizen of the United States, and a resident of Swampscott, in the State of Massachusetts, have invented a certain new and useful Method of Electric Welding, of which the following is a specification.

My present invention relates to an improvement in the operation of forming joints between pieces of metal by the electric-welding process, and is especially applicable to the joining of lengths of wire where it is desirable to make a tough joint without reducing the diameter of the wire at or near the weld, though it is likewise applicable to the formation of electrically-welded joints between other metal pieces or objects wherein the preservation of the original character of the metal without change in the cross-section of the finished work is desirable.

In the operation of electric welding by a butt-welding operation in which the pieces of metal are brought into contact, are heated by the electric current, and are then subjected to end pressure, it is found that the metal at and near the weld is liable to have its character changed during the welding operation. This change is especially apparent in metals which actually melt when the weld is made, a fibrous metal often becoming of a cast or crystalline nature. Such is true of copper and its alloys, and although in a great many cases this is not objectionable, it is so in the case of wire, as the toughness and elasticity of the metal is impaired. This may not appear in the drawing operation, as a straight pull might exhibit no deterioration of the strength; but a bending operation—such as occurs in winding the wire—would prove the changed character very quickly. The same is true of low grades of iron. It is well-known that the fibrous quality of the metal may be restored by a certain amount of hammering, rolling, pressing, or similar operation; but in certain classes of work, especially in the case of welding copper wire, it is very desirable that the diameter of the work be uniform through the entire length, or that there be no substantial reduction of the diameter produced in any part of the work in reaching the finished result. There would be no difficulty in obtaining the desired result were it not that the change in the character of the metal takes place not only at the weld itself, but extends some way each side thereof, so that the hammering, rolling, or compressing operation would naturally result not only in the reduction of the burr itself, but would compress or reduce the diameter of the work to one side of the burr or part immediately involved in the weld, thus changing the cross-section of the product or reducing it below the size desired in the finished product. To overcome this difficulty and to produce a finished joint with the metal restored to its original character not only at the weld itself, but in the parts affected to each side of the weld, I propose to upset or enlarge the metal pieces at either side of the part involved in the weld or burr, so as to produce an expansion of the diameter of the work upon which the hammering, rolling, or compressing operation may be performed, and the restoration of the metal to its original character may be secured without reducing the size of the work. Such expansion or upsetting of the metal at the parts adjacent to the weld and which are affected in the manner before mentioned may be done either before or after the welding operation. I prefer ordinarily to perform this upsetting after the weld has been produced, in which case the metal is ordinarily allowed to cool and is then reheated and subjected to the proper compression in a longitudinal direction, so as to expand or upset it laterally. After this has been done the compressing, rolling, or hammering operation is resorted to for the purpose of restoring the character of the upset portion.

Figure 2:
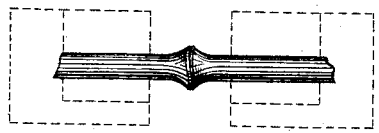
Figure 3:
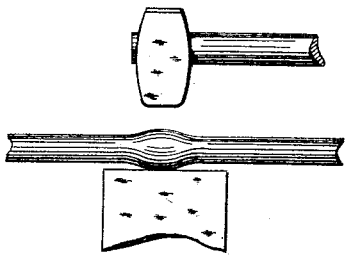
Figure 4:
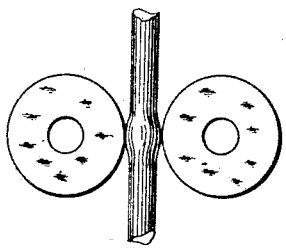
Figure 5:

In the accompanying drawings I have shown in Figure 1 a plan of a part of an apparatus to be employed in the electric-welding process forming the subject of my prior patent, No. 347,140. Fig. 2 illustrates the work at a certain stage of the operation wherein my present invention is employed. Figs. 3 and 4 illustrate modifications in the part of the operation involving the use of hammering or compression. Fig. 5 illustrates a modification of my invention, which consists in expanding or upsetting the material to either side of the joint previously to the welding operation.

In Fig. 1 I have shown in plan view the clamps of one type of welding apparatus, wherein the work is supported in clamps or holders, which form the terminals of a source of electric current of large volume, and one of said clamps is provided with a mechanism for forcing or moving it toward the other clamp, so as to press the pieces in abutment toward one another and effect the weld. The usual burr formed in the welding operation is indicated at *a*. In a weld formed in this manner without further manipulation the metal between the clamps where it is highly heated will be found to be of a cast or crystalline structure, this characteristic being most decided at the point of union, or just where the burr exists and gradually sloping off.

The work might be hammered or compressed when in the shape shown in Fig. 1, and while heated; but it is obvious that the compressing or hammering could not be effectually applied to the parts of the work to either side of the weld or burr *a*, which parts are involved with those whose character has been changed by the heating without reducing the diameter of the work at such parts below that of other portions. To overcome this difficulty I propose to reheat the work and apply longitudinal pressure, so as to upset or expand the metal between the clamps, as shown in Fig. 2, such expansion involving the parts which have assumed a cast or crystalline character in the welding operation. The burr at the weld having been ground off, should it be appreciably large, the work at such expanded or upset portion may be hammered, as indicated in Fig. 3, by rolling, as indicated in Fig. 4, or subjected to other compressing or mechanical operation, designed to restore the fibrous or similar characteristic of the metal, such operation being obviously now possible without danger of reducing the diameter of the work below its normal diameter.

Instead of producing the upset or expansion in the work after the welding operation, it may be produced before putting the work into the clamps for welding. Thus, as indicated in Fig. 5, the ends of the metal bars, rods, or wires to be abutted and welded together may be upset, as indicated in Fig. 5, by any desired operation, either by hammering or by the process described in my prior Patent No. 396,010, dated January 8, 1889, after which the weld may be formed and the metal immediately afterward subjected to the operation designed to restore the metal to its original character.

While I have stated that the metal is cooled and then subsequently expanded, it will be apparent that the expansion or upsetting of the metal to include the parts which have assumed a crystalline or similar character near the weld might be produced by continuing the movement of the clamp beyond that necessary to merely form the weld itself, as indicated at *a*. In this instance the movement imparted to the clamps for upsetting them would be in the same way as in the welding operation proper, excepting that the movement or the force of compression would be continued beyond the point necessary to merely effect the weld and would finally upset or expand the portions which lie beyond the welded portion to either side thereof, and are heated sufficiently to have a crystalline or cast character when allowed to cool without hammering.

What I claim as my invention is—

1. The herein-described improvement in electric welding by placing pieces in abutment, heating them by a current of electricity passing from one to the other, and then subjecting them to end pressure, consisting in expanding or upsetting the metal of the work either before or after the welding operation, and then employing the hammering, rolling, or other reducing operation used for restoring the character of the metal, as and for the purpose described.

2. The herein-described improvement in the art of electrically welding rods, bars, or wires of copper or similar material, as described, by causing heavy currents to traverse the joint to be welded and applying end pressure or force tending to move the pieces to be welded toward one another, consisting in producing an expansion or upset of the metal in the parts thereof beyond those which require to be upset in order to effect a butt weld, and applying the hammering, rolling, or other compressing operation to such additionally expanded or upset parts.

3. The herein-described improvement in welding wire by the electric-welding process of placing the ends of the wire in abutment, passing a current across the joint and subjecting the weld to end pressure, consisting in upsetting the wire beyond the parts which are necessarily upset in order to effect a weld which would in the ordinary operation retain their character, but by heating are liable to have their fibrous structure changed, and applying the usual hammering, rolling, or compressing operation to such additionally-expanded portions, thereby restoring the metal to its normal condition without reducing the diameter of the wire below its normal, as and for the purpose described.

4. The herein-described improvement in electric-welding operations, which consists in forming the weld by the application of the electric current and end pressure, permitting the metal to cool, and then reheating the metal and applying pressure so as to upset the heated metal to either side of the weld preliminarily to the application of the hammering, rolling, or other operation designed to restore the fibrous character of the metal.

Signed at Lynn, in the county of Essex and State of Massachusetts, this 8th day of July, A. D. 1890.

ELIHU THOMSON.

Witnesses:
JULY W. GIBBONEY,
DUGALD McKILLOP.